June 2, 1959 S. LUBKIN 2,889,534
BINARY SERIAL COMPARATOR
Filed June 11, 1954 4 Sheets-Sheet 1

INVENTOR.
SAMUEL LUBKIN
BY S.C. Yuter
ATTORNEY.

June 2, 1959 S. LUBKIN 2,889,534

BINARY SERIAL COMPARATOR

Filed June 11, 1954 4 Sheets-Sheet 2

COMPARATOR 201

INVENTOR.
SAMUEL LUBKIN
BY S.C. Yuter
ATTORNEY.

INVENTOR.
SAMUEL LUBKIN
BY S.C. Yuter
ATTORNEY.

INVENTOR.
SAMUEL LUBKIN
BY S.C. Yuter
ATTORNEY

United States Patent Office 2,889,534

Patented June 2, 1959

2,889,534

BINARY SERIAL COMPARATOR

Samuel Lubkin, Brooklyn, N.Y., assignor to Underwood Corporation, New York, N.Y., a corporation of Delaware Application June 11, 1954, Serial No. 436,037

8 Claims. (Cl. 340—149)

This invention relates to information processing and more particularly to apparatus for determining the relationship between items of information.

The determining of the relationship between items of information is an important function which is often performed in data processing. For example, it is frequently neccessary to compare numbers to determine whether they are equal or, if not equal, to determine which of the numbers is largest or smallest. Additionally, it is often necessary to compare names or groups of letters to determine their alphabetic order.

A device which performs the function of determining whether items of information are the same or of determining the relative order of significance of the items is commonly known as a comparator.

Comparators generally compare items of information by examining the "characters" by which the items are represented. A character may be a numerical digit, a letter of the alphabet, a punctuation mark, a space, a symbol which may produce a carriage return when transmitted to an electrically operated typewriter, or any similar symbol.

The characters which represent an item of information are usually accorded a degree of significance by virtue of their relative positions in the group of characters which denote the item. Thus, in the number 4395, 5 is the least significant character, 9 is the second least significant character, 3 is the second most significant character, and 4 is the most significant character. In the name JONES, S may be designated as the least significant character and J as the most significant character.

Comparators operate by comparing characters of like significance. Thus, in comparing 4395 to 4874, 5 is compared to 4, 9 to 7, 3 to 8 and 4 to 4. The most significant position in which a difference exists determines the comparative order of significance between the items being compared.

Many data processors can supply characters to comparators in either increasing or decreasing order of significance, i.e., least significant or most significant characters first.

An object of the invention is to provide a comparator which avoids the necessity of inverting the order of characters of information items when the characters are supplied in either increasing or decreasing order of significance.

A further object of the invention is to provide an improved comparator of relatively low cost.

Another object of the invention is to provide an improved comparator which can operate at a very high speed.

Briefly, a comparator in accordance with the invention comprises means for receiving signals which represent items of information which contain groups of characters having different degrees of significance. The characters can be received in either increasing or decreasing order of significance. Comparing means are provided which are responsive to the receiving means for comparing the characters of the items and indicating the relative order of the items.

An advantage of comparators designed in accordance with the invention is the conservation of useful data processing time since no time is required for inverting the order of characters.

The invention will be more readily understood from the following description and the accompanying drawings in which:

Fig. 5 shows the symbol for a gate.

Fig. 6 illustrates the circuit represented by the symbol of Fig. 5.

Fig. 7 shows the symbol for a buffer.

Fig. 8 illustrates the circuit represented by the symbol of Fig. 7.

Fig. 9 shows the symbol for a D.-C. amplifier.

Fig. 10 illustrates the circuit represented by the symbol of Fig. 9.

Fig. 11 shows the symbol for a flip flop.

Fig. 12 is a logical diagram of the circuit represented by the symbol of Fig. 11.

Fig. 13 shows the symbol for a pulse amplifier.

Fig. 14 shows the circuit represented by the symbol of Fig. 13.

Figure 1:
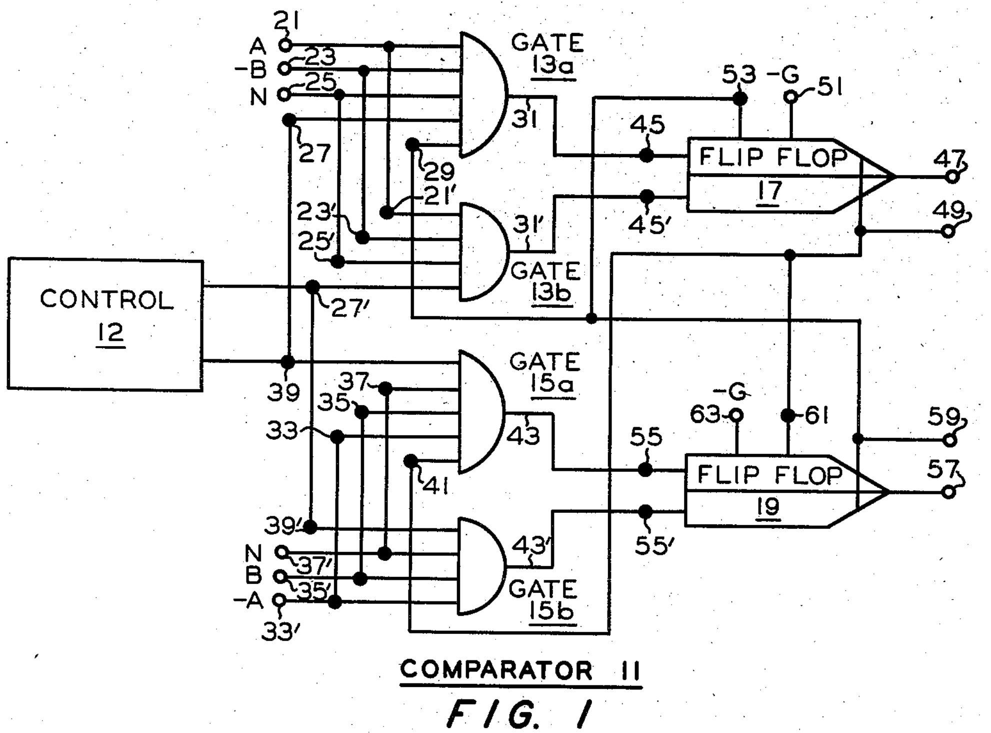
Fig. 1 is a logical diagram of a comparator which compares the characters of information items in accordance with a first embodiment of the invention.

The comparators shown herein as illustrative of the invention are electronic circuits which function to receive and compare signals representative of two items of information. Each type of comparator operates by receiving two information items with the serially arranged characters of one item being synchronously disposed to the serially arranged characters of the second item. Thus, each comparator sequentially receives characters of like order of significance from each of the information items. The characters are received either least or most significant character first in accordance with the invention.

Although not specifically limited thereto, the comparators of the invention are especially well-suited for use with electronic digital computers of the data processing type.

Many electronic digital computers process information items after the characters have been binarily coded as indicated by Table I. Other codes can also be used as, for example, the well known "excess-three" code. Alphabetic characters may be coded in a similar manner.

TABLE I

| Character: | Binary code |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

The binary code is not an arbitrarily chosen code, but is based upon the binary system which uses the binary digits (or "bits") one and zero. The binary system is a numerical means of expressing a quantity in terms of coefficients of powers of two. For example, the decimal digit 5 is expressed as 101 in the binary system as shown below:

| | |
|---|---|
| Decimal: | |
| as used | 5 |
| as understood | $5(10)^0$ |
| or | $5\times1=5$ |
| Binary: | |
| as used | 101 |
| as understood | $1(2)^2+0(2)^1+1(2)^0$ |
| or | $4 \quad + \quad 0 \quad +1=5$ |

Since the base of this system is two, each coefficient only needs two distinct values, and zero and one are used for this purpose.

As is common to the better-known decimal system, the bits of a binary number possess different degrees of significance in accordance with their relative position in a number. Thus, in Table I, the bit at the right hand side of each number is the least significant bit and the bit at the left hand side of each number is the most significant bit.

Multiple digit decimal numbers may be expressed with the equivalent groups of bits being substituted for each of the decimal digits. The bits of each decimal digit may be arranged in increasing or decreasing order of significance. Thus, the decimal number 85 may be expressed as 10000101 or as 00011010.

The binary system has been used because of the ease with which bits can be expressed in an electrical signal. For example, a zero may be expressed by the absence of a pulse and a one by the presence of a pulse. As a specific example, the character 5 (0101) may be represented electrically as follows: no pulse, pulse, no pulse, pulse (most significant bit first); or pulse, no pulse, pulse, no pulse (least significant bit first).

The ones may be represented by either positive or negative pulses. Normally, a character is binarily coded in terms of positive pulses and the use of negative pulses signifies inverse binary coding.

Normal and inverse coding can be combined in a two voltage-level system wherein the absence of a positive pulse in the normal code is represented by the same potential as is the presence of a negative pulse in the negative code. For example, the voltage used to represent both the absence of a positive pulse in the normal code and the maximum swing of a negative pulse is the negative code may be minus ten volts. A positive pulse in the normal code is represented by the same potential as is the absence of a pulse in the negative code. For example, the voltage used to represent both the maximum swing of a positive pulse in the normal code and the absence of a negative pulse in the inverse code may be plus five volts.

An information item composed of a particular combination of positive pulses in normal coding is represented in inverse coding by a signal having a negative pulse corresponding in position to each of the positive pulses.

It should be noted in the description which follows that there is no intrinsic limitation on the speed with which the comparator can respond to the pulses received. For example, the apparatus can easily function in conjunction with circuits which supply pulses at rates in excess of one-hundred thousand pulses per second.

Referring now to the apparatus illustrated in Fig. 1, comparator 11 comprises the gates 13*a–b* and 15*a–b* and the flip flops 17 and 19. The comparator 11 compares two items of information either least or most significant character first as indicated by signals from a control 12.

The gates 13 and 15 (hereinafter described in detail) are coincidence gates, each comprising a crystal diode network which function to receive input signals via a plurality of input terminals and to pass only the most negative signal.

In a two voltage-level system wherein the lower voltage level is a negative potential and the upper voltage level is a positive potential, each of the gates 13 and 15 will pass a positive signal only when all of the input signals to the gate are positive.

The gate 13*a* includes the input terminals 21, 23, 25, 27 and 29 for receiving input signals. When positive signals are coincident at the input terminals 21, 23, 25, 27 and 29, the gate 13*a* transmits a positive output signal via the coupling line 31. The gate 13*a* transmits a negative signal when a negative signal is present at any of the input terminals 21, 23, 25, 27 and 29.

The gate 13*b* includes the input terminals 21′, 23′, 25′ and 27′ and transmits its output signal via the coupling line 31′.

The gate 15*a* includes the input terminals 33, 35, 37, 39 and 41 for receiving input signals and at the coincidence of positive input signals transmits the resulting positive output signal via the coupling line 43. The gate 15*a* transmits a negative signal when a negative signal is present at any of the input terminals 33, 35, 37, 39 and 41.

The gate 15*b* transmits a positive signal via the coupling line 43′ when positive signals are coincidentally present at the input terminals 33′, 35′, 37′ and 39′. Otherwise the gate 15*b* transmits a negative signal.

The flip flops 17 and 19 (hereinafter described in greater detail) are bi-stable electronic circuits each having a positive and a negative output terminal. In the two voltage-level system previously mentioned, one of the output terminals, arbitrarily designated the positive output terminal, is maintained at the negative potential level and the other output terminal, designated the negative output terminal, is maintained at the positive potential level to indicate the "reset" state. Upon receipt of a positive signal at the input to the flip flop, the potential levels of the two output terminals are interchanged to indicate the second or "set" stable state.

Once a flip flop is set it remains set until a negative signal is received via one of a number of "reset" terminals. The reset terminals are normally maintained at a positive potential.

The flip flop 17 includes the input terminals 45 and 45′, the positive output terminal 47, the negative output terminal 49, and the reset terminals 51 and 53.

The flip flop 19 includes the input terminals 55 and 55′, the positive output terminal 57, the negative output terminal 59 and the reset terminals 61 and 63.

The negative output terminal 49 of the flip flop 17 is connected to the reset terminal 61 of the flip flop 19 and the negative output terminal 59 of the flip flop 19 is connected to the reset terminal 53 of the flip flop 17. The negative output terminals 49 and 59 are also respectively connected to the input terminals 41 and 29.

In operation, the flip flops 17 and 19 are normally reset so that the input terminals 29 and 41 are at a positive potential. Narrow pulses N, which are positive square-wave pulses having approximately a twenty-five percent duty cycle (see line N of Fig. 2), are continually fed to the input terminals 25, 25′, 37 and 37′ of the gates 13 and 15. The narrow pulses N have a repetition rate equal to the repetition rate of pulses in an information signal.

The control 12 (which may be, for example, a mechanical or electronic switch) indicates to the comparator 11 whether the characters are being received in increasing or decreasing order of significance. If the characters are received in decreasing order of significance, the control 12 transmits positive signals to the input terminals 27 and 39 so that the gates 13*a* and 15*a* sample the data. If the characters are received in increasing order of significance, the control 12 transmits positive signals to the input terminals 27′ and 39′ so that the gates 13*b* and 15*b* sample the data. Only one set of gates 13 and 15 are so primed at one time.

The information signals are received via the remaining input terminals 21, 21′, 23, 23′, 33, 33′, 35 and 35′. Since the previously mentioned control signals which are received via one set of the input terminals 25, 27, 29, 37, 39 and 41 are positive (as controlled by the control 12), positive pulses can pass through one of the gates 13 and 15 if the information signals received by the gate are coincidentally positive.

More particularly, the gates 13 receive the signal A, representing the normally coded first item of information, via the input terminals 21 and 21′, respectively. The gates 13 receive the signal —B, representing the inversely coded second item of information, via the input terminals 23 and 23′, respectively.

The gates 15 receive the signal —A, representing the inversely coded first item of information, via the input terminals 33 and 33′, respectively, and the signal B, representing the normally coded second item of information, via the input terminals 35 and 35′, respectively.

It will be noted that each of the gates 13 and 15 receive the normally coded representation of one information item and the inversely coded representation of the other information item. Therefore, when there are absences of pulses at a given time in each of the two information signals (representing two zero), the normally coded signals A and B are negative and prevent the gates 13 and 15 from passing positive pulses. Similarly, when there are pulses in each of the information signals at a given time (representing two ones), the inversely coded signals —A and —B are negative and prevent the gates 13 and 15 from passing positive pulses. Thus, neither of the gates 13 or 15 can pass a positive pulse when either two ones or two zeros are received simultaneously.

Conversely, when there is an inequality between corresponding bits in the information items to be compared, one of the gates 13 or 15 will pass a positive pulse. More particularly, the gate which receives the normally coded one and which is primed by the control 12 will pass the positive pulse thus indicating that the normally-coded bit is the larger.

The possible combinations of input signals are illustrated in Table II with respect to the operation of the gates 13 and 15.

TABLE II

| Gates 13 Input | | Gates 15 Input | | Gates 13 Output | Gates 15 Output |
|---|---|---|---|---|---|
| A | —B | —A | B | | |
| 1 | 0 | 0 | 1 | Negative | Negative. |
| 0 | 1 | 1 | 0 | Negative | Negative. |
| 1 | 1 | 0 | 0 | Positive | Negative. |
| 0 | 0 | 1 | 1 | Negative | Positive. |

Therefore, when the corresponding bits of the information items A and B are not equal (as shown in the A and B columns), a positive pulse is produced at the output of the gate receiving the larger bits; that is, the gate receiving the one. Since only one of the gates 13 and 15 passes a positive pulse at a given time, only one of the flip flops 17 and 19 can be set at that time to produce a positive signal at its positive output terminal. Thus a single exclusive indication of the result is given.

When characters are compared in decreasing order of significance, the comparator 11 operates by inspecting the bits of each character in decreasing order of significance. When comparing characters in increasing order of significance, the comparator 11 inspects the bits of increasing order of significance.

Thus the comparator 11 can operate on data whose bits and characters are recorded in either increasing or decreasing order of significance regardless of the order in which the data is read from the medium on which it is stored.

For example, if the decimal number 48 is recorded as 01001000, the comparator 11 can operate properly with the number whether it is received as 01001000 or as 00010010 provided that the control 12 indicates the order in which the data is received.

If the characters and bits of two information items are inspected in decreasing order of significance, the comparator 11 is controlled by the first inequality to indicate the relative order of the items. If the characters and bits of two information items are inspected in increasing order of significance, the comparator 11 detects each inequality but responds to the last inequality to indicate the relative order of the items. The indications are retained by the setting of one of the flip flops 17 and 19 as previously explained.

More particularly, the gates 13*a* and 15*a* are primed by the switch 12 when the characters and bits are to be inspected in decreasing order of significance. Since these gates also receive signals from the negative output terminals 59 and 49, respectively, the setting of one of the flip flops 17 and 19 blocks the gate associated with the other flip flop. Thus, the first setting of a flip flop, which indicates the first inequality, determines the result of the comparison.

The gates 13*b* and 15*b* are primed by the switch 12 when the characters and bits are to be inspected increasing order of significance. Since these gates are not connected to the negative output terminals 49 and 59, the gates are not blocked by the setting of a flip flop 17 or 19 and continue to pass signals until the end of the comparison. As a result, the last inequality determines which flip flop is set at the end of comparison and indicates the result.

A negative pulse —G is utilized at the reset terminals 51 and 63 of the flip flops 17 and 19 to clear these flip flops prior to the receipt of two information items which are to be compared.

Figure 2:
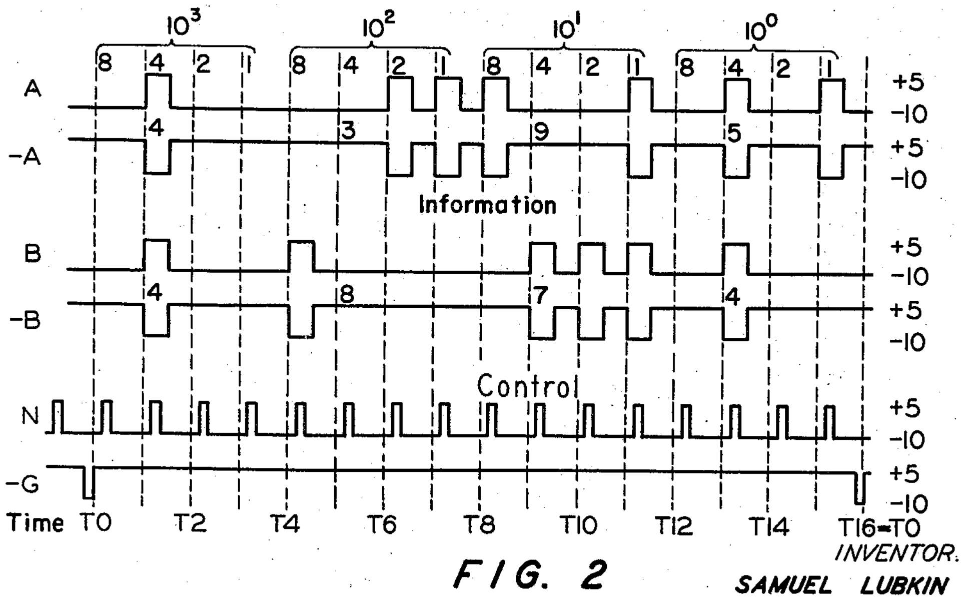
Fig. 2 is a time chart of a representative set of signals which may occur in the comparator of Fig. 1 when items are compared most significant characters first.

Fig. 2 is a time chart of signals which are received by the comparator 11 for the purpose of comparing two numbers such as 4395 and 4874. In this example, the characters and bits of the two numbers are inspected in decreasing order of significance. The time chart illustrates the information signals A, —A, B and —B, and the control signals N, and —G. The signals A and —A represent the number 4395 and the signals B and —B represent the number 4874.

The abscissa of the time chart is divided into time units arbitrarily chosen to equal the time length of a pulse position in which a bit is represented. The designation T indicates the time at which the pulse positions begin. For example, T0 represents the initial time at which the most significant bit of the most significant character of an information signal is received by the comparator 11.

In accordance with inspecting the bits of an information item in decreasing order of significance, the number 4395 is represented with the most significant bit (zero) of the most significant character 4 occurring at time T0. Similarly, the most significant bit (zero) of the most significant character 4 of the number 4874 is also represented as first appearing at T0. Thus, in both cases the most significant bit of the most significant character is represented by the absence of a pulse.

The pulses are arbitrarily shown as being square wave pulses having a fifty percent duty cycle. Other wave forms and percentage duty cycles may be used without deviating from the principle of the invention.

Arbitrary voltage levels have also been chosen to illustrate the two voltage level system and are, namely: plus five volts for the higher potential level and minus ten volts for the lower potential level.

The narrow pulses N having a twenty-five percent duty cycle (also arbitrarily selected) are phased so as to be centered timewise during the occurrence of the information pulses representing the items of information.

The negative pulses G are negative square wave pulses occurring at the comparator 11 immediately preceding the receipt of the information signals. The purpose of a negative pulse G, as previously indicated, it is to reset the flip flops 17 and 19 so as to clear them for comparing two items of information.

Referring again to the signals A, —A, B and —B, it will be noted that in reading the chart from left to right, the most significant bit (zero) of the most significant character appears at T0 and bits in decreasing order of significance appear sequentially in the horizontal direction to the right. A graphic illustration of normal and inverse coding of a bit also appears on the chart. For example, the positive and negative pulses occurring respectively in the A and —A signals at T1 are illustrative of normal and inverse coding.

These positive and negative pulses are further illustrative of the practical use of the narrow pulses N. Should, for example, a negative pulse be slightly out of phase with its associated positive pulse, two simultaneous positive potentials would be inadvertently present at one of the gates 13 and 15 for the duration of the phase difference. Likewise, poor rise-times of the positive and negative pulses can cause objectionable voltage spikes to pass through the gates. The inclusion of the narrow pulses N as inputs to the gates 13 and 15 permits the gates 13 and 15 to sample only the central portions of these pulses so that slight phase differences between the pulses or poor rise-times do not cause the gates 13 and 15 to pass positive signals where none is desired.

The operation of the comparator 11 of Fig. 1 while receiving the signals indicated by the time chart of Fig. 2 will next be explained.

Immediately preceding the receipt of information signals, and more particularly, immediately prior to T0, negative pulse —G is received in the comparator 11 and is fed to the reset terminals 51 and 63. The negative pulse —G insures that the flip flops 17 and 19 are reset before comparison of the two information items is begun.

Furthermore, the control 12 transmits a positive signal to the input terminals 27 and 39 to indicate that characters are to be received in decreasing order of significance.

At T0, the signal A appears as a negative potential at the input terminal 21 of the gate 13*a* so that the gate 13*a* passes a negative signal via the coupling line 31 to the input terminal 45 of the flip flop 17. At the same time, the signal B appears as a negative potential at the input terminal 35 of the gate 15*a* so that the gate 15*a* passes a negative potential via the coupling line 43 to the input terminal 55 of the flip flop 19. As a result, from T0 to T1 neither of the flip flops 17 or 19 is set.

At T1, the signal —B appears as a negative potential at the input terminal 23 and prevents the gate 13*a* from passing a positive signal to the flip flop 17. Simultaneously the signal —A appears as a negative potential at the input terminal 33 to prevent the gate 15*a* from passing a positive signal to the flip flop 19.

Until T4 one of the input terminals 21 and 23 and one of the input terminals 33 and 35 is negative and prevents the gates 13*a* and 15*a* from passing a signal which sets one of the flip flops 17 or 19.

At T4, however, when the first bits representing the second most significant characters are received, the signals appearing at the input terminals 33 and 35 are both positive. The gate 15*a* passes a positive signal to set the flip flop 19. This indicates that the number 4874 has the larger bit in the most significant position of inequality, and that 4874 is the larger of the two information items.

The positive potential appearing at the positive output terminal 57 of the flip flop 19 indicates that the signal B represents the larger of the two information items.

Additionally, the negative potential which then appears at the negative output terminal 59 is transmitted to the input terminal 29 to block the gate 13*a* and prevent further examination of the signal A. As an additional precaution, the negative potential at the negative output terminal 59 may be sent to the reset terminal 53 of the flip flop 17 to insure that the flip flop 17 is reset. The positive signal remains at the output terminal 57 until just before the beginning of the comparison of the next information items. Then, at time T16 which corresponds to time T0, the flip flop 19 is reset by the reset signal —G.

Thus, the comparator 11 functions to compare the characters of two information items in decreasing order of significance and indicates which of the information items represented by the signals is the larger.

Figure 3:
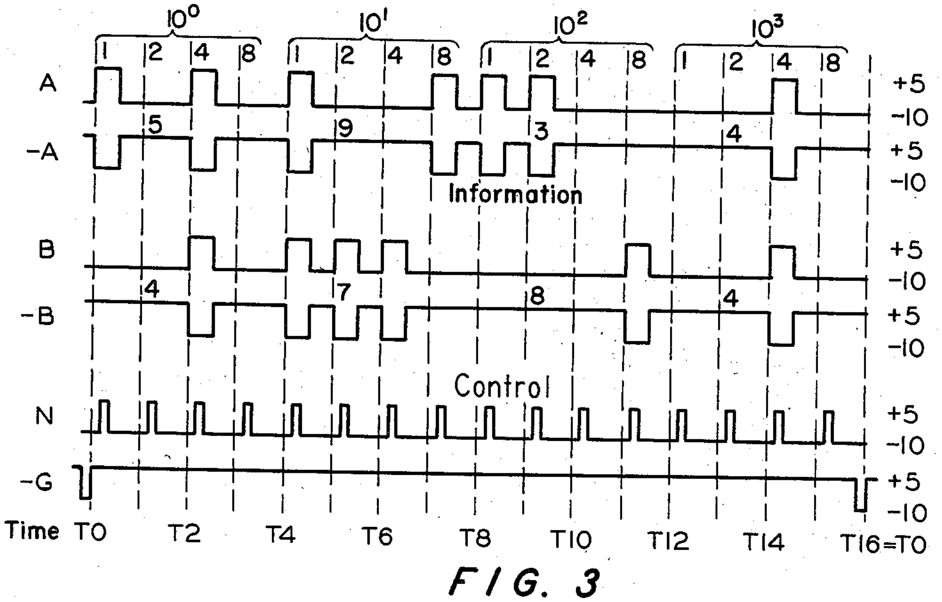
Fig. 3 is a representative time chart for the comparator of Fig. 1 when items are compared least significant characters first.

Fig. 3 is a time chart of the signals which are received by the comparator 11 when the characters and bits of the numbers 4395 and 4874 are received in increasing order of significance.

It will be noted that at T0, the flip flops 17 is set since A and —B are coincidentally positive. At T5, the flip flop 19 is set thereby resetting flip flop 17. Flip flop 17 is again set (flip flop 19 being thereby set) at T7.

Finally at T11, flip flop 19 is set by the coincidence of positive potentials in —A and B. Since no further positive signals are passed by the gates 13*b* and 15*b*, the flip flop 19 remains set and indicates that 4874 is greater than 4395.

Thus, the comparator 11 compares the characters and bits of two information items in increasing order of significance and indicates the relative order of the items.

Coded alpha-numeric, as well as purely alphabetic information, can similarly be compared by the apparatus and methods described. One of the various codes for alphabetic and numeric characters is illustrated in Table III. It should be noted that six-bit groups are used to provide the number of combinations required to express all of the characters:

TABLE III

| Character | Sequence Position | Binary Code | Character | Sequence Position | Binary Code |
|---|---|---|---|---|---|
| 0 | 0 | 000000 | I | 18 | 010010 |
| 1 | 1 | 000001 | J | 19 | 010011 |
| 2 | 2 | 000010 | K | 20 | 010100 |
| 3 | 3 | 000011 | L | 21 | 010101 |
| 4 | 4 | 000100 | M | 22 | 010110 |
| 5 | 5 | 000101 | N | 23 | 010111 |
| 6 | 6 | 000110 | O | 24 | 011000 |
| 7 | 7 | 000111 | P | 25 | 011001 |
| 8 | 8 | 001000 | Q | 26 | 011010 |
| 9 | 9 | 001001 | R | 27 | 011011 |
| A | 10 | 001010 | S | 28 | 011100 |
| B | 11 | 001011 | T | 29 | 011101 |
| C | 12 | 001100 | U | 30 | 011110 |
| D | 13 | 001101 | V | 31 | 011111 |
| E | 14 | 001110 | W | 32 | 100000 |
| F | 15 | 001111 | X | 33 | 100001 |
| G | 16 | 010000 | Y | 34 | 100010 |
| H | 17 | 010001 | Z | 35 | 100011 |

As an illustration of alphabetic comparison, in comparing A (001010) to B (001011), the most significant difference is found in the least significant bit position and indicates that B follows A in sequence.

With the six-bit code, the comparator 11 operates substantially as has been described.

Figure 4:
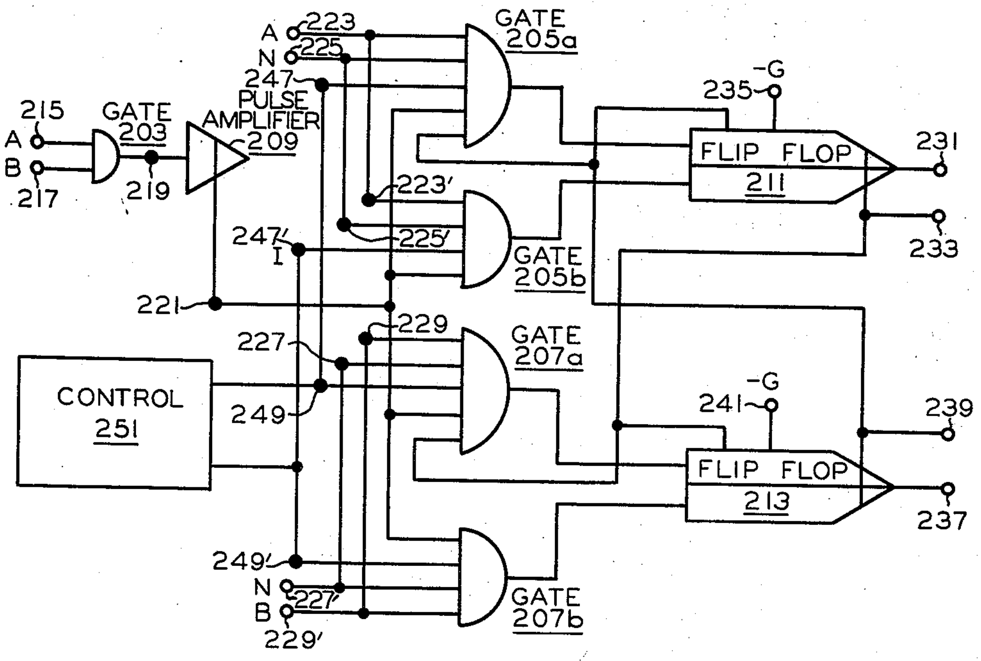
Fig. 4 is a comparator in accordance with a second embodiment of the invention.

Referring now to the comparator 201 shown in Fig. 4, a circuit is shown which operates in a manner similar to that described for the comparator 11. The comparator 201, however, does not require an inverted code.

The comparator 201 comprises the gates 203, 205*a–b*, 207*a–b*, the pulse amplifier 209 and the flip flops 211 and 213 and receives control signals from the control 251.

The gate 203 includes the input terminals 215 and 217 by which are received the signals A and B, respectively. The gate 203 feeds its signals to the input terminal 219 of the pulse amplifier 209.

The pulse amplifier 209 includes the negative output terminal 221. The pulse amplifier 209 produces a positive signal at the negative output terminal 221 except if a positive pulse is received via the input terminal 219. When a positive pulse is received via the input terminal 219, the pulse amplifier 209 produces a negative signal at the negative output terminal 221 for the duration of the positive input pulse.

The negative output terminal 221 is connected to the gates 205*a–b* and 207*a–b*. The gate 205*a* includes the input terminal 223 by which the signal A is received and the input terminal 225 by which the narrow pulses N are received. The gate 205*b* receives A and N via the input terminals 223′ and 225′, respectively. The gate 207*a* includes the input terminal 227 by which the narrow pulses N are received and the input terminal 229 by which the signal B is received. The gate 207*b* receives N and B via the input terminals 227′ and 229′, respectively.

The gates 205*a* and 207*a* receive a positive signal via the input terminals 247 and 249 from the control 251 when characters are received in decreasing order of significance by the comparator 201. The gates 205*b* and 207*b* receive a positive signal via the input terminals 247′ and 249′ from the control 251 when characters are received in increasing order of significance.

Signals passed by the gates 205 are fed to the flip flop 211 which includes a positive output terminal 231, a negative output terminal 233 and a reset terminal 235 by which the signal −G is received. The negative output terminal 233 is coupled to an input terminal of the gate 207*a*.

Signals passed by the gates 207 are fed to the flip flop 213. The flip flop 213 includes a positive output terminal 237, a negative output terminal 239 and a reset terminal 241 by which the signal −G is received. The negative output terminal 239 is connected to an input terminal of the gate 205*a*.

When the flip flop 211 is set and a positive signal appears at the poistive output terminal 231, the comparator 201 indicates that A is greater than B. When flip flop 213 is set and a positive signal appears at the positive output terminal 237, the comparator 201 indicates that B is greater than A. Thus the gates 205 must satisfy the condition of passing a positive signal only when a bit of A is greater than a bit of B and the gates 207 must satisfy the condition of passing a positive signal only when a bit of B is greater than a bit of A. No signal is passed by the gates 205 and 207 when A equals B.

More particularly, when A equals B and both are zeros, negative signals appear at the input terminals 223, 223′, 229 and 229′ of the gates 205 and 207 thereby preventing a positive signal from being passed to either of the flip flops 211 and 213. Thus neither of the flip flops 211 or 213 are set.

If A and B are equal and both are ones, the gate 203 passes a positive signal. The positive signal is received by the pulse amplifier 209 which produces a negative signal at its negative output terminal 221 and prevents the gates 205 and 207 from passing a signal to set either of the flip flops 211 and 213.

If A is a one and B is a zero, the gate 203 is blocked by the negative signal present at the input terminal 217. A positive signal therefore appears at the negative output terminal 221. The gate 205 which is primed by the control 251 is enabled to pass a positive pulse (A being positive) upon the occurrence of a narrow pulse N. The flip flop 211 is thereby set and a positive signal appears at the positive output terminal 231 to indicate that A is greater than B.

If B represents a one and A represents a zero, the gate is blocked and a positive signal appears at the negative output terminal 221. The gate 207 which is primed by the control 251 is enabled to pass a positive signal upon the occurrence of a narrow pulse N. The flip flop 213 is thereby set and a positive signal occurs at the positive output terminal 237 to indicate that B is greater than A.

As previously described for the comparator 11, when either of the flip flops 211 and 213 are set, negative signals appear at the negative output terminals 233 or 239 and are fed back to the associated gate 205*a* or 207*a* thereby preventing additional positive pulses from being passed when the characters are inspected in decreasing order of significance. Thus comparison is completed upon the first detcetion of an inequality by the comparator 201.

If the characters are being inspected in increasing order of significance, the gates 205*b* and 207*b* are activated by the control 251. The gates 205*b* and 207*b* are not blocked by the setting of either of the flip flops 211 and 213 and thus comparison continues until the most significant bits of the most significant characters are compared.

As has been previously explained, the negative signal −G is utilized to reset the flip flops 211 and 213 to prepare for the comparison of new characters or information items.

Thus in accordance with the invention, comparators have been provided which compare the characters of the items of information in either increasing or decreasing order of significance. Because of the simple apparatus involved these comparators are of relatively low cost. It should be noted that these comparators can be simply adapted to comparing selected characters of the information items by the use of additional inhibiting signals.

*Description of symbols*

The schematic equivalents of the symbols which have been employed to simplify the detailed description of the comparators 11 and 101 will next be described. It should be understood that the circuits described can be replaced by other circuits which perform similar functions.

*Gate*

The gates used in the comparators are of the "coincidence" type, each comprising a crystal diode network which receives input signals via a plurality of input terminals and passes the most negative signal.

Figure 5:
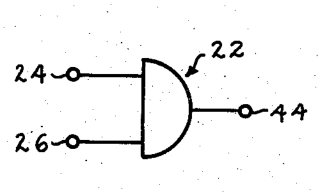
Figs. 5 through 14 illustrate the symbols and the circuits represented by these symbols which are employed to illustrate the comparators of Figs. 1 and 4.

The symbol for a representative gate 22, having two input terminals 24 and 26, is shown in Fig. 5. If additional input terminals are required, they are illustrated as terminals connected by additional lines to the symbol.

Since the signal potential levels are plus five volts (positive signals) and minus ten volts (negative signals), the potentials of the signals which may exist at the input terminals 24 and 26 are thereby limited.

If a potential of minus ten volts is present at one or both of the input terminals 24 and 26, a potential of minus ten volts exists at the output terminal 44. Therefore, if one of the input signals to the input terminals 24 and 26 is positive and the other signal is negative, the negative signal is passed and the positive signal is "blocked."

When there is a coincidence of positive signals at the two input terminals 24 and 26, a positive signal is transmitted from the output terminal 44. In such case, it may be stated that a positive signal is "gated" or "passed" by the gate 22.

Figure 6:
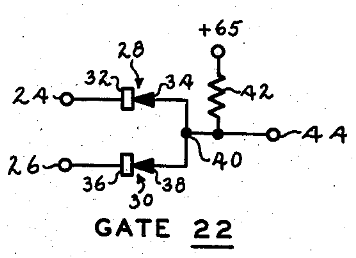

The schematic details of the gate 22 are shown in Fig. 6 and include the crystal diodes 28 and 30.

Each of the input terminals 24 and 26 is coupled to one of the crystal diodes 28 and 30. Crystal diode 28 comprises the cathode 32 and the anode 34. Crystal diode 30 comprises the anode 38 and the cathode 36. The input terminals 24 and 26 are respectively coupled to the cathodes 32 and 36. The anode 34 of the crystal diode 28 and the anode 38 of the crystal diode 30 are interconnected at the junction 40. The anodes 34 and 38 are coupled via the resistor 42 to the positive voltage bus 65.

If negative potentials are simultaneously present at the input terminals 24 and 26, both of the crystal diodes 28 and 30 conduct, since the positive supply bus 65 tends to make the anodes 34 and 38 more positive. The voltage at the junction 40 is then minus ten volts since, while conducting, the anodes 34 and 38 of the crystal diodes 28 and 30 assume the potential of the associated cathodes 32 and 36.

When, for example, a positive signal is fed only to the input terminal 24, the cathode 32 is raised to a positive five volts potential and is made more positive than the anode 34 so that crystal diode 28 stops conducting. As a result, the potential at the junction 40 remains at the negative ten volts level. In a similar manner, when a positive signal is only present at the input terminal 26, the voltage at the junction 40 will not be changed.

When the signals present at both input terminals 24 and 26 are positive, the anodes 34 and 38 are raised to approximately the same potential as their associated cathodes 32 and 36 and the potential at the junction 40 rises to a positive potential of five volts.

The potential which exists at the junction 40 is transmitted from the gate 22 via the connected output terminal 44.

In the above described manner, the gate 22 is frequently used as a switch to govern the passage of one signal by the presence of one or more signals which control the operation of the gate 22.

It should be understood that the potentials of plus five volts and minus ten volts used for purpose of illustration are approximate, and the exact potentials can be affected in two ways. First, they can be affected by the value of the resistance 42 and its relation to the impedances of the input circuits connected to the input terminals 24 and 26. Second, they can be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 44 to prevent the terminal from becoming more negative than a predetermined voltage level to protect the diodes 28 and 30 against excessive back voltages and to provide the proper voltage levels for succeeding circuits.

*Buffer*

The buffers used in the comparators are also known as "or" gates. Each buffer comprises a crystal diode network which receives input signals via plurality of input terminals and passes the most positive signal.

Figure 7:
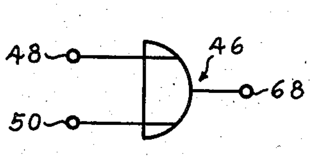

The symbol for a representative buffer 46, having two input terminals 48 and 50, is shown in Fig. 7. If additional input terminals are required, they are illustrated as terminals connected to additional lines which pass through the symbol.

Since the signal potential levels in the system are minus ten volts and plus five volts, either one of these potentials may exist at the input terminals 48 and 50.

If a positive potential of five volts exists at one or both of the input terminals 48 or 50, a positive potential of five volts exists at the output terminal 68. If a negative potential of ten volts is present at both of the input terminals 48 and 50, a negative potential of ten volts will be present at the output terminal 68.

Figure 8:
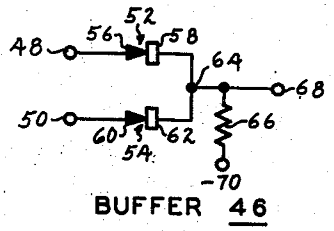

The schematic details of the buffer 46 are shown in Fig. 8. The buffer 46 includes the two crystal diodes 52 and 54. The crystal diode 52 comprises the anode 56 and the cathode 58. Crystal diode 54 comprises the anode 60 and the cathode 62. The anode 56 of the crystal diode 52 is coupled to the input terminal 48. The anode 60 of the crystal diode 54 is coupled to the input terminal 50. The cathodes 58 and 62 of the crystal diodes 52 and 54, respectively, are joined at the junction 64 which is coupled to the output terminal 68 and, via the resistor 66, to the negative supply bus 70. The negative supply bus 70 tends to make the cathodes 58 and 62 more negative than the anodes 56 and 60, respectively, causing both crystal diodes 52 and 54 to conduct.

When negative ten volt signals are simultaneously present at input terminals 48 and 50, the crystal diodes 52 and 54 conduct and the potential at the cathodes 58 and 62 approaches the magnitude of the potential at the anodes 56 and 60. As a result, a negative potential of ten volts appears at the output terminal 68.

If the potential at one of the input terminals 48 or 50 increases to plus five volts, the potential at the junction 64 approaches the positive five volts level as this voltage is passed through the conducting crystal diode 52 or 54 to which the voltage is applied. The other crystal diode 52 or 54 stops conducting since its anode 56 or 60 becomes more negative than the junction 64. As a result, a positive potential of five volts appears at the output terminal 68.

If positive five volt signals are fed simultaneously to both input terminals 48 and 50, a positive potential of five volts appears at the output terminal 68, since both crystal diodes 52 and 54 conduct. Thus the buffer 46 functions to pass the most positive signal received via the input terminals 48 and 50.

*D.-C. amplifier*

Figure 9:
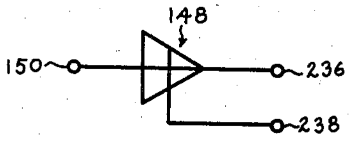

The symbol for a representative D.-C. amplifier 148 which is used in the flip flops of the apparatus is shown in Fig. 9. When a positive signal is present at the input terminal 150, a positive signal of five volts appears at the positive output terminal 236 and a negative signal of ten volts is present at the negative output terminal 238. If a negative potential is present at the input terminal 150, the potentials at the output terminals 236 and 238 are reversed.

Figure 10:
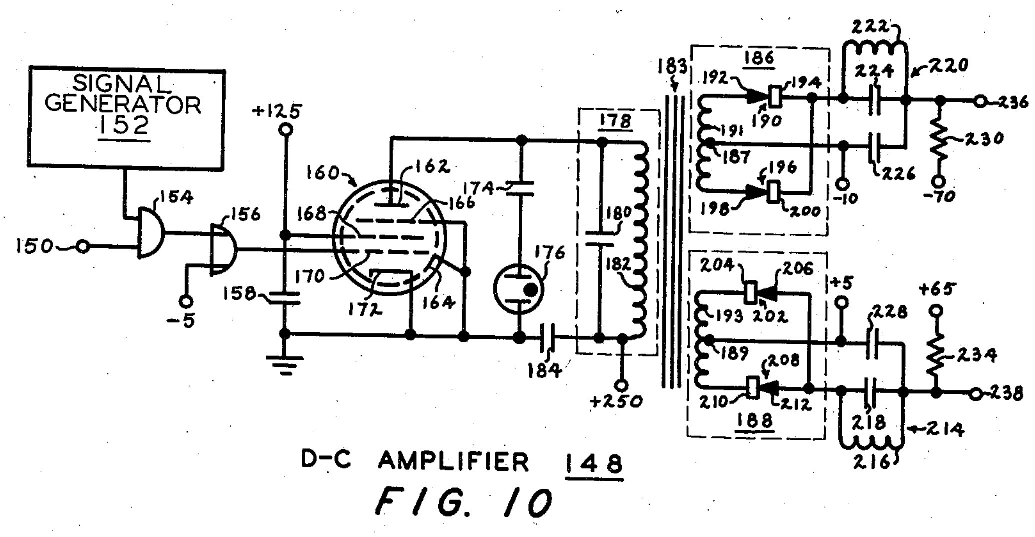

As shown in Fig. 10, the D.-C. amplifier 148 includes the gate 154, the buffer 156, the vacuum tube 160, the transformer 183, the full-wave rectifiers 186 and 188, and the filters 220 and 214.

The input terminal 150 is connected to one input terminal of the gate 154. The other input of the gate 154 is fed a one megacycle carrier signal from the signal generator 152 which is a signal generator of known type. The megacycle carrier signal swings from minus ten to plus five volts.

One input of the buffer 156 is connected to the output of the gate 154. The other input of the buffer 156 is connected to the negative supply bus 5. The buffer 156 couples the output of the gate 154 to the control grid 170 of the vacuum tube 160.

The vacuum tube 160 is a five element tube having a grounded cylindrical shield 164, and includes the anode 162 connected via the primary winding 182 of the transformer 183 to a positive supply bus 250. The junction of the positive supply bus 250 and the primary winding 182 is coupled via the capacitor 184 to ground. The vacuum tube 160 also includes the suppressor grid 166 which is connected to ground, the screen grid 168 which is connected to the positive supply bus 125 and via the capacitor 158 to ground, and the cathode 172 which is grounded.

The anode 162 of the vacuum tube 160 is also connected via the coupling capacitor 174 to the neon tube 176 which is grounded. The capacitor 180 is connected in parallel with the primary winding 182 of the transformer 183 to form the parallel tank circuit 178 which is tuned to the frequency of the carrier signal.

The full-wave rectifier 186 is connected to the secondary winding 191 having its center tap 187 connected to the negative supply bus 10. The full-wave rectifier 186 includes the pair of crystal diodes 190 and 196. The anodes 192 and 198 of the crystal diodes 190 and 196 are respectively coupled to opposite ends of the secondary winding 191 of the transformer 183, and the cathodes 194 and 200 of the crystal diodes 190 and 196 are interconnected.

The full-wave rectifier 188 is connected to the secondary winding 193 having its center tap 189 connected to the positive supply bus 5.

The full-wave rectifier 188 includes the pair of crystal diodes 202 and 208. The cathodes 204 and 210 of the crystal diodes 202 and 208 are coupled to opposite ends of the secondary winding 193, and the anodes 206 and 212 of the crystal diodes 202 and 208 are connected together.

The filter 220 which couples the cathodes 194 and 200 of the crystal diodes 190 and 196 to the positive output terminal 236 is a parallel tank circuit which includes the capacitor 224 and the inductor 222. The capacitor 226 connects the positive output terminal 236 to the negative supply bus 10. The positive output terminal 236 is also coupled via the resistor 230 to the negative supply bus 70.

The filter 214, which couples the anodes 206 and 212 of the crystal diodes 202 and 208 to the negative output terminal 238, is a parallel tank circuit which includes the capacitor 218 and the inductor 216. The capacitor 228 connects the negative output terminal 238 to the positive supply bus 5. The negative output terminal 238 is also coupled by the resistor 234 to the positive supply bus 65.

Initially, the crystal diodes 190 and 196 are in a conductive state such that the potential at the positive output terminal 236 is approximately minus ten volts. Similarly, the crystal diodes 202 and 208 are initially in a conductive state such that the potential at the negative output terminal 238 is approximately plus five volts.

When a signal is fed to the input terminal 150 it is combined with the one megacycle carrier and fed to the buffer 156. As previously noted, one input terminal of the buffer 156 is connected to a negative five volts supply bus so that all signals at the output of gate 156 which are equal to or more positive than minus five volts will be passed by the buffer 156. A signal passed by the buffer 156 is applied to the control grid 170 of the vacuum tube 160. The signal is amplified by vacuum tube 160 and appears across the parallel tank circuit 178. The parallel tank circuit 178 is tuned to the frequency of the incoming signal so that the maximum signal will be passed by the parallel tank circuit 178 to the full-wave rectifiers 186 and 188.

The full-wave rectifier 186 delivers a positive signal which is then filtered by the filter 220 to appear as a positive direct-current potential of approximately five volts at the positive output terminal 236. The full-wave rectifier 188 delivers a negative signal which is then filtered by the filter 214 to appear as a negative direct-current potential of approximately ten volts at the negative output terminal 238.

Thus, if a positive signal is present at the input terminal 150, the voltage at the positive output terminal 236 is plus five volts, and the potential at the negative output terminal 238 is minus ten volts. However, if no signal is present at the input terminal 150, the voltage at the positive output terminal 236 will be minus ten volts, and the potential at the negative ouput terminal 238 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

*Flip-Flop*

A flip-flop of the type used in the comparators is a bistable electronic circuit with two output terminals, one of which is maintained at one potential level and the other of which is maintained at a second potential level to indicate one stable state. Upon receipt of a signal of suitable magnitude at its input the potential levels of the two output terminals are interchanged to indicate a second stable state.

Figure 11:
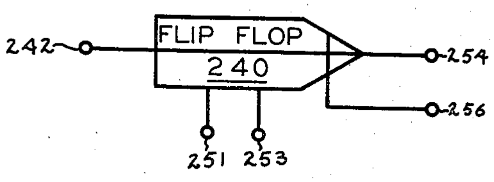

The symbol for a representative flip-flop 240 is illustrated in Fig. 11. The flip-flop 240 comprises the input terminal 242, two example reset terminals 251, 253, positive output terminal 254, and negative output terminal 256. Additional input terminals are shown in a similar manner.

One stable state of the flip-flop 240 is the normal condition which is designated "reset" and exists when a negative potential of ten volts appears at the positive output terminal 254 and a positive potential of five volts appears at the negative output terminal 256. The second stable state is designated "set" and exists when a positive potential of five volts appears at the positive output terminal 254 and a negative potential of ten volts appears at the negative output terminal 256.

The flip-flop 240 is set when a positive input signal is received via its input terminal 242, and this is true irrespective of any reset signal which may simultaneously be transmitted to the reset terminals 251 or 253 of the flip-flop 240.

Once set, the flip-flop remains set as long as positive signals are received via the reset terminals 251 and 253 even though the "setting" pulse or signal has terminated. When the signal received via a reset terminal such as 251 becomes negative, the flip-flop 240 is reset unless a positive pulse or signal is simultaneously being received via the input terminal 242.

Stated more generally, the flip-flop 240 is set by the receipt of a positive input signal via the input terminal 242 and is reset by a coincidence of a negative input signal and at least one reset signal. After being reset, the flip-flop 240 remains reset until the above recited set conditions are fulfilled.

Figure 12:
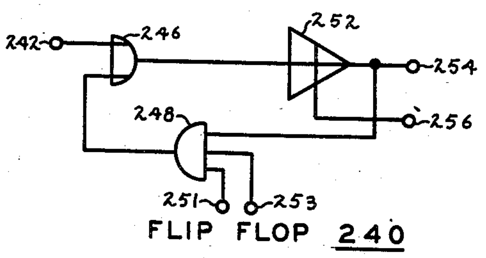

The detailed circuitry of the flip-flop 240 is illustrated in Fig. 12 employing some of the logical symbols previously described.

The flip-flop 240 comprises the buffer 246, the D.-C. amplifier 252 and the gate 248.

The input terminal 242 is the input terminal of the buffer 246. A positive signal which is transmitted to the input terminal 242 is passed through the buffer 246 to the D.-C. amplifier 252, and causes the D.-C. amplifier 252 to generate a positive potential of five volts at its positive output terminal 254 and a negative potential of ten volts at its terminal output terminal 256.

The gate 248 couples the positive output terminal 254 of the D.-C. amplifier 252 to the buffer 246. When a positive signal is present at the reset terminals 251 and 253, the gate 248 passes the positive signal to the buffer 246. Thus a feedback path is provided which enables the positive potential of five volts to be maintained at the positive output terminal 254 and which is blocked only when a negative signal causes the gate 248 to be blocked.

It should be noted that a reset signal which causes the gate 248 to be blocked will not prevent a set signal at the buffer 246 from causing the D.-C. amplifier 252 to generate a positive potential of five volts at its positive output terminal 254 during the existence of the set signal.

*Pulse amplifier*

Figure 13:
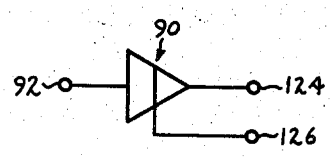

The symbol for a representative pulse amplifier is shown in Fig. 13. When a positive pulse is fed to the pulse amplifier 90 via the input terminal 92, the pulse amplifier 90 functions to transmit a positive pulse which swings from minus ten to plus five volts from its positive output terminal 124, and a negative pulse which swings from plus five to minus ten volts from its negative output terminal 126. At all other times, the pulse amplifier 90 has a negative potential of ten volts at its positive output terminal 124 and a positive potential of five volts at its negative output terminal 126.

Figure 14:
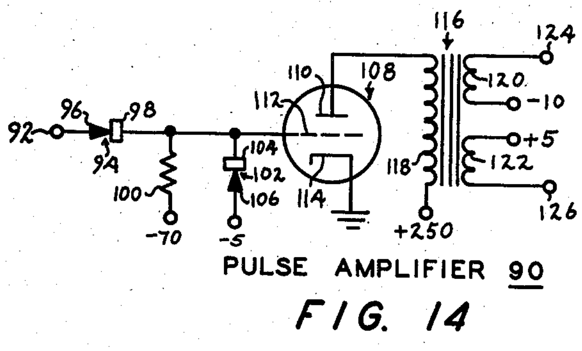

The detailed circuitry of the pulse amplifier 90 is shown in Fig. 14. The pulse amplifier 90 includes the vacuum tube 108, the pulse transformer 116 and associated circuitry. The vacuum tube 108 comprises the cathode 114, the grid 112 and the anode 110. The pulse transformer comprises the primary winding 118 and the secondary windings 120 and 122.

The crystal diode 94 couples the grid 112 of the vacuum tube 108 to the input terminal 92, the anode 96 of the crystal diode 94 being coupled to the input terminal 92, and the cathode 98 being coupled to the grid 112. The negative supply bus 70 is coupled to the grid 112 via the resistor 100 and tends to make the crystal diode 94 conductive. The grid 112 and the cathode 98 of the crystal diode 94 are also coupled to the cathode 104 of the crystal diode 102, whose anode 106 is coupled to the negative supply bus 5. The crystal diode 102 clamps the grid 112 at a potential of minus five volts thus preventing the voltage applied to the grid 112 from becoming more negative than minus five volts.

When a voltage more positive than minus five volts is transmitted to the input terminal 92, the crystal diode 94 conducts and the voltage is applied to the grid 112. Since the crystal diode 102 clamps the grid 112 and the cathode 98 of the crystal diode 94 at minus five volts, any voltage more negative than minus five volts will cause the crystal diode 94 to become nonconductive, and that input voltage will be blocked at the crystal diode 94. Thus, the clamping action of the crystal diode 102 will not affect the circuitry which supplies the input voltage.

The cathode 114 of the vacuum tube 108 is connected to ground potential. The anode 110 of the vacuum tube 108 is coupled by the primary winding 118 of the pulse transformer 116 to the positive supply bus 250. The outer ends of the secondary windings 120 and 122 of the pulse transformer 116 are coupled respectively to the positive output terminal 124 and the negative output terminal 126. The inner ends of the secondary windings 120 and 122 are coupled respectively to the negative supply bus 10 and the positive supply bus 5.

A positive pulse which is fed to the grid 112 of the vacuum tube 108 will be inverted at the primary winding 118 of the pulse transformer 116 which is wound to produce a positive pulse in the secondary winding 120 and a negative pulse in the secondary winding 122. These pulses respectively drive the positive output terminal 124 up to a positive five volts potential and the negative output terminal 126 down to a negative ten volts potential because of the circuit parameters.

When the vacuum tube 108 is non-conducting, the negative ten volts potential is fed through the secondary winding 120 and appears at the positive output terminal 124. At the same time, the positive five volts potential is fed through the secondary winding 122 to the negative output terminal 126. These latter conditions are the normally existing conditions at the output terminals 124 and 126.

There will now be obvious to those skilled in the art many modifications and variations utilizing the principles set forth and realizing many or all of the objects and advantages of the circuits described but which do not depart essentially from the spirit of the invention.

What is claimed is:

1. A comparator for comparing a pair of information items, each item consisting of characters arranged in either an increasing or a decreasing order of significance and being represented by signals, said comparator comprising a first indicator settable to indicate that a first item is more significant than the second, a second indicator settable to indicate that the second item is more significant than the first, an item receiving means for each of said indicators, each receiving means receiving signals representing both items and passing a signal to its indicator only when said item representing signals are of different magnitude, a resetting connection from each indicator to the other indicator to reset a set indicator when the other indicator is set, and a control means settable in accordance with the order of significance of said characters, said control means in one set condition enabling a set indicator to disable at least the receiving means for the other of said indicators.

2. A comparator for comparing a pair of information items, each item being composed of a plurality of characters arranged in a first or a second order of significance and being represented by a series of electrical signals, said comparator comprising a pair of settable indicating devices, one for each item and when set indicating that the received portion of the associated item is more significant than the received portion of the other item, a resetting connection from each indicating device operative when the device is set to reset the other indicating device from a set condition, a receiving-comparing means for each indicator, each receiving-comparing means receiving signals representing both items and operative to pass a signal to set its indicating device when the currently received character of the associated item is more significant that the corresponding character of the other item, a control device settable in accordance with the order of significance of receipt of said characters, and blocking means controlled by said control device and said indicating means to prevent passage of a signal through a receiving-comparing means when said control device is set for a certain order of significance and the indicating device for the other receiving-comparing means is set.

3. A comparator for comparing a pair of information item, each item represented by a series of electrical signals arranged in either an increasing or a decreasing order of significance, corresponding signal positions of said items being simultaneously available, said comparator comprising a first comparing means to pass a signal if a signal is present in an available signal position of the first of said items and not in the second item, a second comparing means to pass a signal if a signal is present in an available signal position of the second of said items and not in the first item, a normally reset indicator coupled to each comparing means to be set when its coupled comparing means passes a signal, resetting connections between said indicators to enable a set indicator to reset the other indicator, a control device settable in accordance with the order of significance of said signals, and means controlled by said control device when set for a decreasing order of significance and by an indicating device when set, to prevent setting of the other of said indicators.

4. A comparator for comparing two information items, each item being represented by a series of electrical signals located in time positions having either an increasing or a decreasing order of significance and having corresponding time positions of said items in synchronism, said comparator comprising, for each item, a pair of receiving gates and an indicator normally reset but settable by a signal passed by either of said gates, a connection from each indicator to the other indicator to reset the other indicator and to prevent passage of a setting signal through one of said pair of gates for said other indicator when the first indicator is set, means to apply to each gate the signals representing its associated item and blocking signals representing the other item so that any item signal is blocked if the other item contains a corresponding signal, and control means settable in accordance with the increasing or decreasing order of significance of said signals to block one or the other of each of the pairs of gates.

5. Apparatus to compare two items of information and determine their relative significance, each item being represented by a sequence of signals arranged in either an ascending or a descending order of significance, said apparatus comprising a receiving means for each item, each receiving means passing the signals of its item, means to block passage of a signal of one item through its receiving means if the other item has a corresponding signal, a pair of indicators, one connected to each receiving means, each indicator being normally in a reset condition and settable by a signal passed through its connected receiving means, a reset circuit for each indicator to reset each indicator when the other indicator becomes set, a cross connection from each indicator to the receiving means for the other indicator to block passage of a signal through the receiving means when the other indicator is set, and a control device settable for either an ascending or descending order of significance of signals and operative when set for a descending order to render said cross connections effective.

6. Electrical apparatus for comparing first and second information items which each consist of characters sequentially arranged in either a first or second order of significance, the characters being represented by normally coded signals and by inversely coded signals, said electrical apparatus comprising first and second gates for receiving the normally coded signals representing the first information item and the inversely coded signals represeting the second information item, third and fourth gates for receiving the normally coded signals representing the second information item and the inversely coded signals representing the first information item, control means, said first and third gates being activated by said control means when the signals are received in accordance with the first order of significance of the characters, said first and third gates when activated passing signals upon the receipt of signals representing unequal characters, said second and fourth gates being activated by said control means when the signals are received in accordance with the second order of significance of the characters, said second and fourth gates when activated passing signals upon the receipt of signals representing unequal characters, and first and second bi-stable devices having set and reset conditions, said first bi-stable device being settable by the signals passed by said first and second gates and thereby indicating that a character of the first information item is larger than a character of the second information item, said second bi-stable device being settable by the signals passed by said third and fourth gates and thereby indicating that a character of the second information item is larger than a character of the first information item, said first gate being deactivated by said second bi-stable device when set, said third gate being deactivated by said first bi-stable device when set.

7. Electrical apparatus for comparing first and second information items which each consist of characters sequentially arranged in either a first or second order of significance, each of the characters being represented by groups of bits sequentially arranged in order of significance, the bits being represented by normally coded signals and by inversely coded signals, said electrical apparatus comprising first and second gates for receiving the normally coded signals representing the first information item and the inversely coded signals representing the second information item, third and fourth gates for receiving the normally coded signals representing the second information item and the inversely coded signals representing the first information item, control means, said first and third gates being actuated by said control means when the signals are received in accordance with the first order of significance of the characters, said first and third gates when activated passing signals upon the receipt of signals representing unequal bits, said second and fourth gates being actuated by said control means when the signals are received in accordance with the second order of significance of the characters, said second and fourth gates when activated passing signals upon the receipt of signals representing unequal bits and first and second bi-stable devices having set and reset conditions, said first bi-stable device being settable by the signals passed by said first and second gates and thereby indicating that a bit of the first information item is larger than a bit of the second information item, said second bi-stable device being settable by the signals passed by said third and fourth gates and thereby indicating that a bit of the second information item is larger than a bit of the first information item, said first gate being inactivated by said second bi-stable device when it is in the set condition, said third gate being inactivated by said first bi-stable device when it is in the set condition.

8. Electrical apparatus for comparing first and second information items which each consist of characters sequentially arranged in either a first or second order of significance, each of the characters being represented by groups of bits sequentially arranged in order of significance, the bits being zeros and ones which are represented by electrical signals, said electrical apparatus comprising a first gate responsive to the electrical signals representing the first and second information items for passing a signal when bits of the first and second information items are equal and ones, second and third gates for receiving the electrical signals which represent the first information item, fourth and fifth gates for receiving the electrical signals which represent the second information item, inverting means coupling said first gate to each of said second, third, fourth and fifth gates for blocking said second, third, fourth and fifth gates when said first gate passes a signal, control means for blocking said third and fifth gates when the characters are arranged in the first order of significance, said control means blocking said second and fourth gates when the characters are arranged in the second order of significance, said second, third, fourth and fifth gates when not blocked passing a signal when a received electrical signal represents a one, and first and second bi-stable devices, said first bi-stable device being settable to a given state by a signal passed by said second or third gate, said second bi-stable device being settable to a given state by a signal passed by said fourth or fifth gate, said second gate being blocked by said second bi-stable device when in the given state, said fourth gate being blocked by said first bi-stable device when in the given state.

References Cited in the file of this patent

UNITED STATES PATENTS

| | | |
|---|---|---|
| 2,589,130 | Potter | Mar. 11, 1952 |
| 2,615,127 | Edwards | Oct. 21, 1952 |
| 2,641,696 | Woolard | June 9, 1953 |
| 2,749,440 | Cartwright | June 5, 1956 |